(12) United States Patent
Kim et al.

(10) Patent No.: US 10,985,985 B2
(45) Date of Patent: Apr. 20, 2021

(54) CLOUD SERVICE SYSTEM

(71) Applicant: GWANGJU INSTITUTE OF SCIENCE AND TECHNOLOGY, Gwangju (KR)

(72) Inventors: Jong Won Kim, Gwangju (KR); Jung su Han, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 16/210,629

(22) Filed: Dec. 5, 2018

(65) Prior Publication Data

US 2019/0173758 A1 Jun. 6, 2019

(30) Foreign Application Priority Data

Dec. 5, 2017 (KR) .......................... 10-2017-0165889

(51) Int. Cl.
| | | |
|---|---|---|
| G06F 15/177 | (2006.01) | |
| H04L 12/24 | (2006.01) | |
| G06F 9/50 | (2006.01) | |
| G06F 11/20 | (2006.01) | |

(52) U.S. Cl.
CPC ........ *H04L 41/0893* (2013.01); *G06F 9/5072* (2013.01); *G06F 11/203* (2013.01); *H04L 41/0668* (2013.01); *H04L 41/0803* (2013.01); *H04L 41/0896* (2013.01); *H04L 41/12* (2013.01); *H04L 41/5054* (2013.01); *H04L 41/5096* (2013.01); *G06F 2201/84* (2013.01)

(58) Field of Classification Search
CPC ..... H04L 41/12; H04L 12/4641; H04L 45/64; H04L 41/0893; H04L 45/586; H04L 41/0806; H04L 61/103; G06F 11/0712
See application file for complete search history.

(56) References Cited

U.S. PATENT DOCUMENTS

| | | | |
|---|---|---|---|
| 9,072,117 B1 * | 6/2015 | Channney ............... | H04W 76/14 |
| 2012/0127183 A1 * | 5/2012 | Vonog .................... | G06F 9/5072 |
| | | | 345/506 |
| 2016/0004551 A1 * | 1/2016 | Terayama ........... | G06F 9/45558 |
| | | | 718/1 |
| 2016/0105321 A1 | 4/2016 | Thakkar et al. | |

(Continued)

FOREIGN PATENT DOCUMENTS

| | | |
|---|---|---|
| KR | 20150137519 A | 12/2015 |
| KR | 20170130833 A | 11/2017 |

OTHER PUBLICATIONS

Jungsu Han, et al., Design of SaaS OverCloud for 3-tier Saas Compatibility over Cloud-based Multiple Boxes, Networked Computing Systems Laboratory School of Electrical Engineering and Computer Science, pp. 1-4, Association for Computing Machinery, Jun. 2017, Gwangju, Korea.

(Continued)

*Primary Examiner* — Oleg Survillo

(74) *Attorney, Agent, or Firm* — Brooks Kushman P.C.

(57) ABSTRACT

A cloud service system includes an overlay cloud managing unit to totally control an overlay cloud which is the cloud for a developer, a cloud provider to provide an infrastructure in which the overlay cloud is configured, and a direct connection point to physically directly connect the overlay cloud managing unit with the cloud provider.

9 Claims, 8 Drawing Sheets

(56) References Cited

U.S. PATENT DOCUMENTS

| | | | | |
|---|---|---|---|---|
| 2016/0277250 A1* | 9/2016 | Maes | ............... | H04L 41/0896 |
| 2017/0093971 A1* | 3/2017 | Feinberg | ............. | H04L 67/1095 |
| 2017/0289002 A1* | 10/2017 | Ganguli | ............. | H04L 43/0876 |

OTHER PUBLICATIONS

Korean Patent Office, Office Action for Korean Patent Application No. 10-2017-0165889, dated Jan. 28, 2019.

* cited by examiner

CLOUD SERVICE SYSTEM

CROSS-REFERENCE TO RELATED APPLICATIONS

This application claims priority to Korean Patent Application No. 10-2017-0165889 filed on Dec. 5, 2017 in Korea, the entire contents of which is hereby incorporated by reference in its entirety.

BACKGROUND

The present invention relates to a cloud service system. More particularly, the present invention relates to a cloud service system.

As a cloud service reduces information technology (IT), and the rapidity and the efficiency in managing IT resources are re-considered, various cloud services have been employed and the issue of integrating the various cloud services has been raised. In addition, a hybrid cloud having both a public cloud and a private cloud has been increasingly utilized. Accordingly, discussions have been actively made about a hybrid access scheme for integrating the public cloud, the private cloud, and conventional Onpremise IT resources.

In addition, a procedure of simply selecting a cloud is provided for a user based on the results which are obtained by collecting and researching information on available cloud services in terms of services for users. In addition, there has been required for a technology of managing resources of multiple vendor clouds, which are distributed by providing a unified interface, thereby reducing time and costs.

Currently, there are gradually increased technologies of building and managing the hybrid cloud into which several cloud infrastructures are integrated. However, such management technologies are focused on only integrating mutually different infrastructures with each other, and thus have a technical limitation under an environment that various software as service (SaaS) applications have to be dynamically configured on integrated infrastructures/platforms. In addition, as the growth of Serverless, which is a trend of new cloud computing, is accelerated, developing schemes based on applications, which do not have to consider an infrastructure state, have been gradually highlighted. In addition, it is more important to construct an environment of dynamically running various applications without the restrictive condition of the infrastructure.

SUMMARY

An embodiment of the present invention is to allow a cloud service system to provide a scheme for dynamically configuring and managing overcloud based on workflow.

In addition, an embodiment of the present invention is to allow the cloud service system to rapidly and dynamically build a cloud for a developer in the instantiation, the maintenance, the migration, and the clean-up of the overlay cloud.

A cloud service system is provided. According to an embodiment of the present invention, the cloud service system includes an overlay cloud managing unit to totally control an overlay cloud which is a cloud for a developer, a cloud provider to provide an infrastructure in which the overlay cloud is configured, and a direct connection point to physically directly connect the overlay cloud managing unit with the cloud provider.

As described above, according to an embodiment of the present invention, the cloud service system provides the scheme for dynamically configuring and managing an overcloud based on workflow.

In addition, according to an embodiment of the present invention, the cloud service system may rapidly and dynamically create the cloud for the developer in the instantiation, the maintenance, the migration, and the clean-up of the overlay cloud.

DETAILED DESCRIPTION OF THE EMBODIMENTS

Hereinafter, the detailed embodiment of the present invention will be described with reference to accompanying drawings. However, the spirit of the present invention is not limited to the following embodiment. Those skilled in the art can easily suggest another embodiment without deviating from the scope of the present invention by adding, modifying, and deleting elements, and should understand that the modifications and the variations fall within the scope of the present invention.

In accompanying drawings, for the convenience of explanation, fine parts may not be expressed in detail when the whole structure is described and the whole structure may not be reflected in detail when the fine parts are described. In addition, although parts are slightly different in the details thereof such as an installation position, if the parts have the same operation, the same name will be assigned to the parts for the convenience of explanation. In addition, when a plurality of components are provided, one component will be representatively described, the description will be identically applied to the other components, and the redundant details of the components will be omitted.

Before the description of the present invention, the terminology used in the present invention will be summarized first.

Overlay cloud (overcloud): a field for providing, for each developer, an environment required by the developer and clustered in a logical cluster unit.

Undercloud: an area facing an integrated hybrid/multi-site cloud infrastructure/platform which is actually built/operated between ICT resources based on a hyper-converged box Software as a service (SaaS): It is a software delivery model, which is called "on-demand software", in which software and relevant data are hosted at the center and a user makes an access through a client such as a web-browser.

SaaS overlay cloud: It is an overlay-based cloud provided for a developer in the logical cluster form over a hybrid/multi-site cloud and provided in the bundle of DevTower, Logical Cluster, and DataLake.

DevOps Tower: A control tower for providing and managing overcloud for developers.

SmartX automation Framework: It receives the requirements of developers and automatically provides the SaaS overlay cloud.

DevTower: Each DevTower totally covers developers and automatizes the whole maintenance such as the provisioning, the visibility, and the orchestration of the SaaS overlay cloud. The data necessary for providing the provisioning, the visibility, and the orchestration is managed through DataStore.

DataLake: It is a storage for storing operation and service (application) data generated when the SaaS overlay cloud is built and operated.

Logical cluster: It is a unit formed by partially selecting and binding resource fragments (virtual/container/physical machine) provided on the under cloud.

Figure 1:
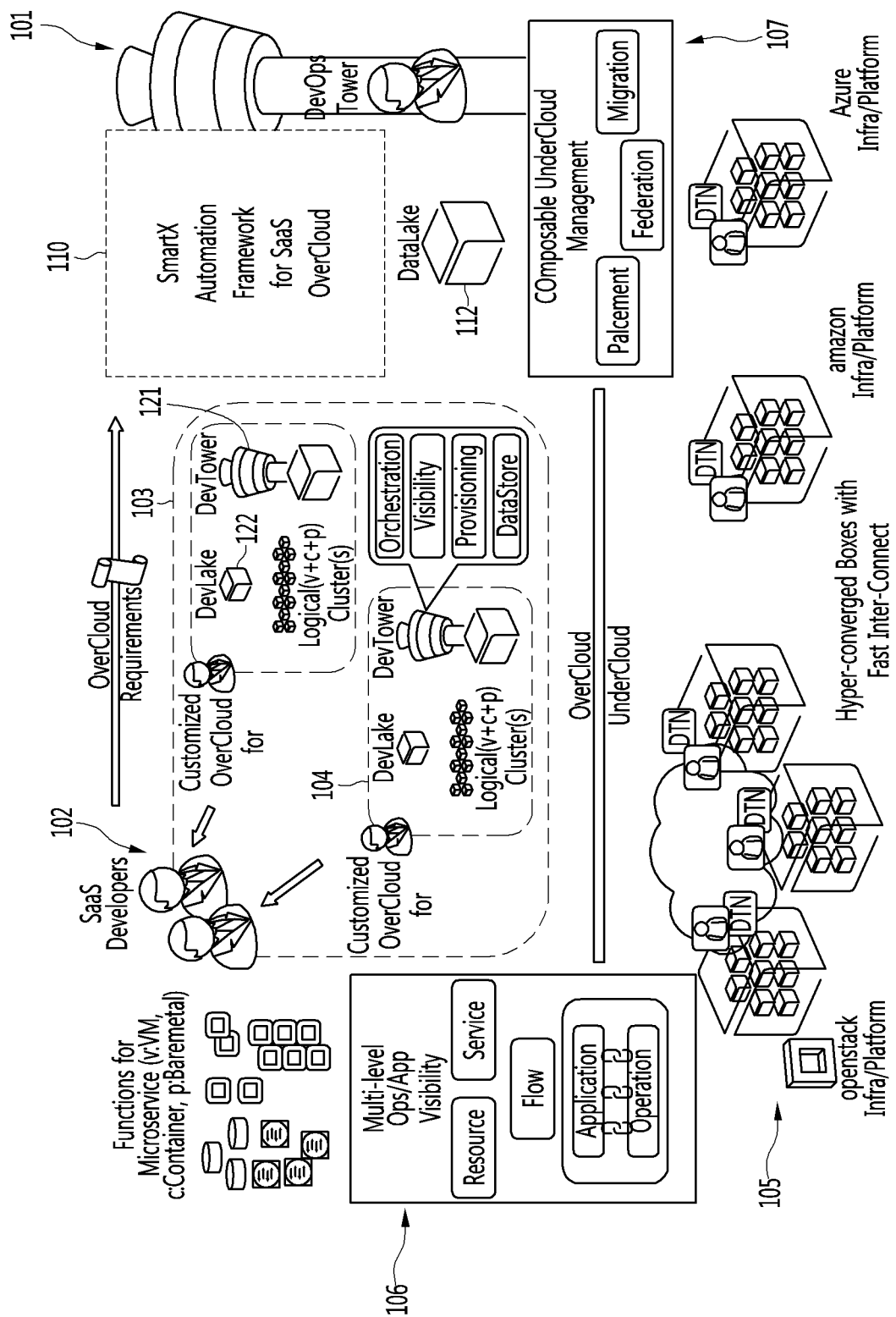
FIG. 1 is a view illustrating the configuration and the operation of a cloud service providing device according to the present invention.

FIG. 1 is a view illustrating the configuration and the operation of a cloud service providing device according to the present invention.

Referring to FIG. 1, the cloud service providing device according to the embodiment operates in such a manner of internetworking, together, an operator 101 that operates the cloud service providing device, a developer 102 (including a user of a cloud service) that uses a cloud service of the developer 102 for developing work, and an under cloud 105 including a public cloud or a private cloud to provide the service.

In detail, the cloud service providing device according to the embodiment operates in such a manner that the operator 101 efficiently distributes and manages the resources of the under cloud 105 depending on the request of the developer 102.

In order to manage stably and efficiently operations, the operator 101 has an operator data store 12 which is assisted by an automatic module 111 such that the policy of the operator 101 is automatically carried out, and stores information necessary for the operator. The automatic module 111 includes an under cloud integrating unit that integrates the under cloud and make a plan for the under cloud, and an under cloud supply unit for arrange the under cloud.

The under cloud 105 includes a public cloud and a private cloud which have been conventionally operated. The under cloud 105 may include at least one cloud, preferably, at least three different clouds. According to an exemplary embodiment, the under cloud 105 may include at least one pubic cloud and at least one private cloud.

In addition, an under cloud managing unit 107 is included to manage the under cloud and a system monitoring unit 106 is further included to monitor the operation of the whole system.

When the developer 102 tries to perform the work of the developer 102, that is, when the developer 102 tries to use the cloud service of the developer 102, the developer 102 transfers a request for the use of the cloud service to the operator 101. The operator 101 operates the automatic module 111 to utilize the resources of the under cloud 105 through the under cloud managing unit 107, thereby providing the cloud service in response to the request of the developer 102. Accordingly, the developer 102 operates an overlay cloud 104 including a developing center 121 and a developer data store 122 which are customized to the developer 102.

When the abnormal operation and the breakdown occur as the operation of the cloud service is monitored, the system monitoring unit 106 detects the abnormal operation and the breakdown and copes with the abnormal operation and the breakdown. Accordingly, the developer 102 may use the over cloud 104 without any error.

Figure 2:
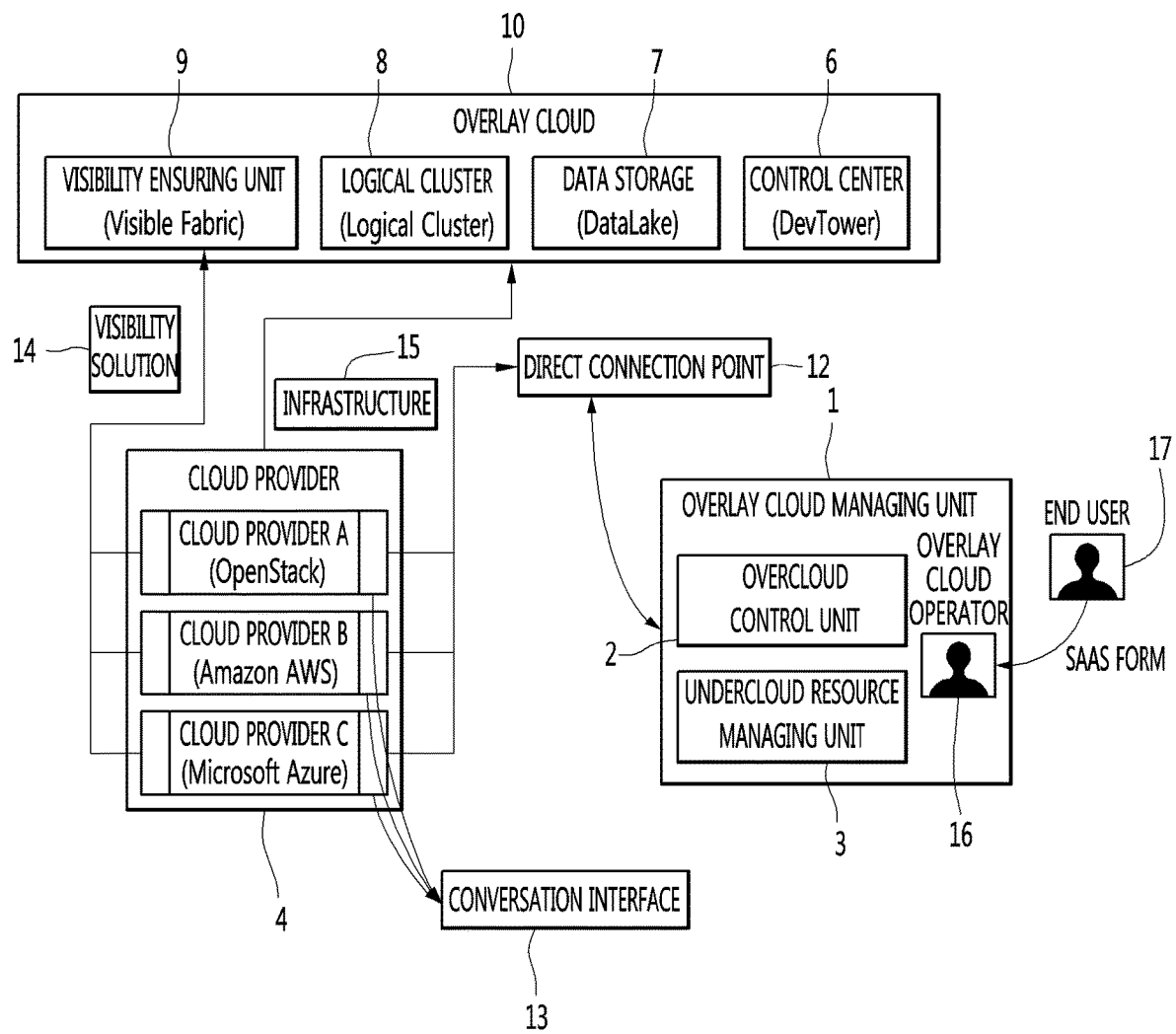
FIG. 2 is a block diagram illustrating a cloud service configuring device and a cloud service providing method, according to an embodiment of the present invention.

FIG. 2 is a block diagram illustrating a cloud service configuring device and a cloud service providing method, according to an embodiment of the present invention.

The cloud service configuring device according to the embodiment illustrated in FIG. 2 is to ensure that the overlay cloud is installed and operated independently from a heterogeneous hybrid/multi-cite cloud infrastructure/platform environment described with reference FIG. 1. In detail, the cloud service configuring device according to an embodiment of the present invention dynamically provides compatible resources through the automatic execution environment, thereby suggesting a scheme of dynamically providing over (lay) cloud on an SaaS overlay cloud framework for providing mutually different services while integrally covering an infrastructure/platform/service.

As illustrated in FIG. 2, the cloud service providing device according to an embodiment of the present invention operates through the internetworking between the overlay cloud managing unit 1, the cloud provider 4, and the overlay cloud 10.

The overlay cloud managing unit 1 may include an overlay cloud control unit 2 and an under cloud resource managing unit 3. The overlay cloud control unit 2 configures and controls the overlay cloud 10. The under cloud resource managing unit 3 efficiently manages and distributes under cloud resources.

The cloud provider 4 includes at least one cloud provider. The cloud provider 4 may refer to a provider of providing a cloud such as OpenStack, Amazon, and Microsoft. The cloud provider 4 may provide at least one of a conversation interface 13, a visibility solution 14, or an infrastructure 15.

The overlay cloud 10, which serves as a cloud for a developer, is managed by the overlay cloud managing unit 1. The overlay cloud 10 includes a visibility ensuring unit 9, a logical cluster 8, a data storage (data lake) 7, and a control center 6. The components of the overlay cloud 10 are configured based on workflow instead of a template by taking into consideration the efficiency and the flexibility of the operation. Accordingly, the overlay cloud according to an embodiment may perform a parallel operation, which is insufficiently performed in an automation process based on a template, through workflow FIGS. 3 to 8 are views illustrating the dynamic configuration of the overlay cloud. According to an embodiment of the present invention, the dynamic configuration of the overlay cloud may be an automatic dynamic configuration of the overlay cloud based on the workflow.

Figure 3:
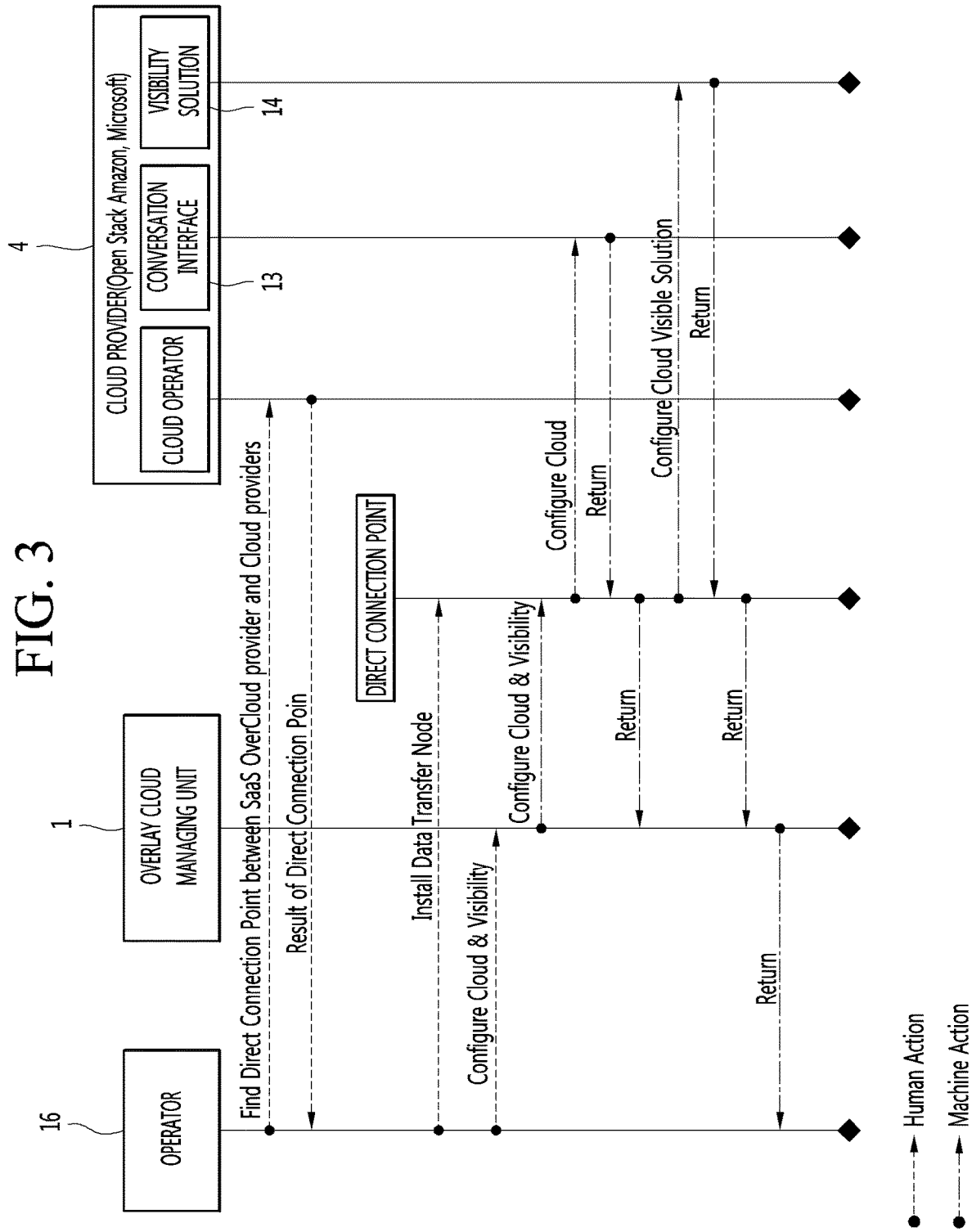
FIG. 3 is a flowchart illustrating the prearrangement between a cloud provider and an overlay cloud managing unit.

FIG. 3 is a flowchart illustrating the prearrangement between the cloud provider 4 and the overlay cloud managing unit.

The infrastructure provided by the cloud provider is an infrastructure which may not be generally controlled. In order to dynamically configure the overlay cloud based on the infrastructure, which may not be controlled, it is necessary to perform a prearrangement process of detecting the requirements of end users. In other words, in order to receive various SaaSs of the end users, it is necessary to clearly organize situations for providing cloud services by configuring the overlay cloud. Hereafter, the prearrangement will be described with respect to FIG. 3.

In this case, a direct physical connection point is necessary between the overlay cloud managing unit 1, which totally controls the configuration of the overlay cloud, and the cloud provider 4 which provides the infrastructure actually configuring the overlay cloud. A high-speed transfer node is required at an intermediate point that several cloud providers 4 meet the overlay cloud managing unit 1 such that the several cloud providers 4 are connected with the overlay cloud managing unit 1, and a direct connection point 12 illustrated in FIG. 3 serves as the high-speed transfer node.

In addition, conversation interfaces 13 are provided to make communication between cloud providers 4 and the overlay cloud managing unit 1. The conversation interface 13 is provided by the cloud providers 4 as described above.

In addition, when the state of the infrastructure which is unable to be controlled is detected, the overlay cloud may be freely configured. The cloud provider 4 provides a visibility solution used for providing the information on the cloud state of the cloud provider 4.

Figure 4:
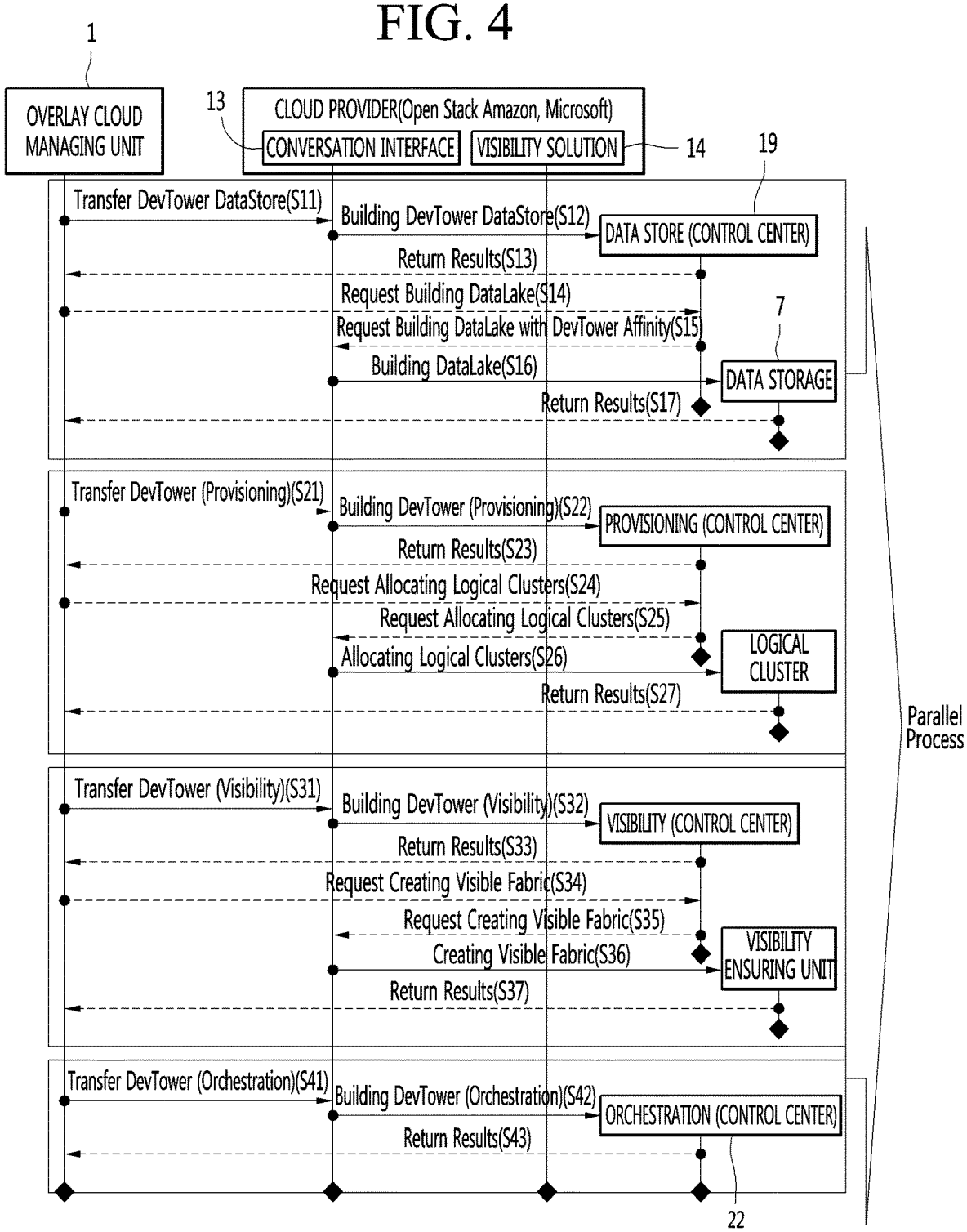
FIG. 4 is a flowchart illustrating a procedure of creating an overlay cloud.

FIG. 4 is a flowchart illustrating a procedure of creating an overlay cloud.

The over cloud instantiation is a procedure of dynamically creating the overlay cloud 10 from the prepared environment. According to an embodiment of the present invention, the over cloud instantiation is configured in the form of evolving from the control center 6 of providing only a smaller function to a control center of providing a complete function.

To this end, functions of the control center 6 are present in the forms that are not independent from each other. The functions of the control center 6 are sequentially transferred while tasks of forming the overlay cloud 10 are performed in parallel in a pipe line form. Accordingly, the overlay cloud 10 may be dynamically and rapidly configured.

As illustrated in FIG. 4, control centers (DevTower) are created with respect to a data store, provisioning, visibility, and orchestration. The control center may perform processes in parallel.

First, the following description will be made regarding the procedure of creating the overlay cloud for the data store.

The overlay cloud managing unit 1 transfers a control center 19 for the data store to the cloud provider 4 (S11). The cloud provider 4 builds the control center 19 for the data store (S12). The control center 19 for the data store returns the result to the overlay cloud managing unit 1 (S13). The overlay cloud managing unit 1 requests for the building of a data lake (a data store) from the control center 19 for the data store (S14). The control center 19 for the data store requests for the building of the data lake from the cloud provider 4 (S15). The cloud provider 4 creates a data lake 7 (S16). The data lake 7 returns the result to the overlay cloud managing unit 1 (S17).

Second, the following description will be made regarding the procedure of creating the overlay cloud for the logical cluster.

The overlay cloud managing unit 1 transfers a control center 20 for the provisioning to the cloud provider 4 (S21). The cloud provider 4 builds the control center 20 for the provisioning (S22). The control center 20 for the provisioning returns the result (S23). The overlay cloud managing unit 1 requests for the allocation of a logical cluster (S24). The control center 20 for the provisioning, which receives the request, requests for the allocation of the logical cluster from the cloud provider 4 (S25). The cloud provider 4 allocates the logical cluster (S26). The result of the logical cluster 8 is returned to the overlay cloud managing unit 1 (S27).

Third, the following description will be made with respect to the procedure of creating the overlay cloud for the visibility ensuring unit.

The overlay cloud managing unit 1 transfers a control center 21 for the visibility to the cloud provider 4 (S31). The cloud provider 4 builds the control center 21 for the visibility (S32). The control center 20 for the visibility returns the result to the overlay cloud managing unit 1 (S33). The overlay cloud managing unit 1 transfers the request for the creation of the visibility ensuring unit to a control center 21 for the visibility (S34). The control center 21 for the visibility transfers the request for the creation of the visibility ensuring unit to the cloud provider 4 (S35). The cloud provider creates the visibility ensuring unit 9 (S36). The visibility ensuring unit 9 returns the result to the overlay cloud managing unit 1 (S37).

Fourth, the following description will be made with respect to the procedure of creating the overlay cloud for the orchestration The overlay cloud managing unit 1 transfers a control center 22 for the orchestration to the cloud provider 4 (S41). The cloud provider 4 builds the control center 22 for the orchestration (S42). The control center 22 for the orchestration returns the result to the overlay cloud managing unit 1 (S43).

Figure 5:
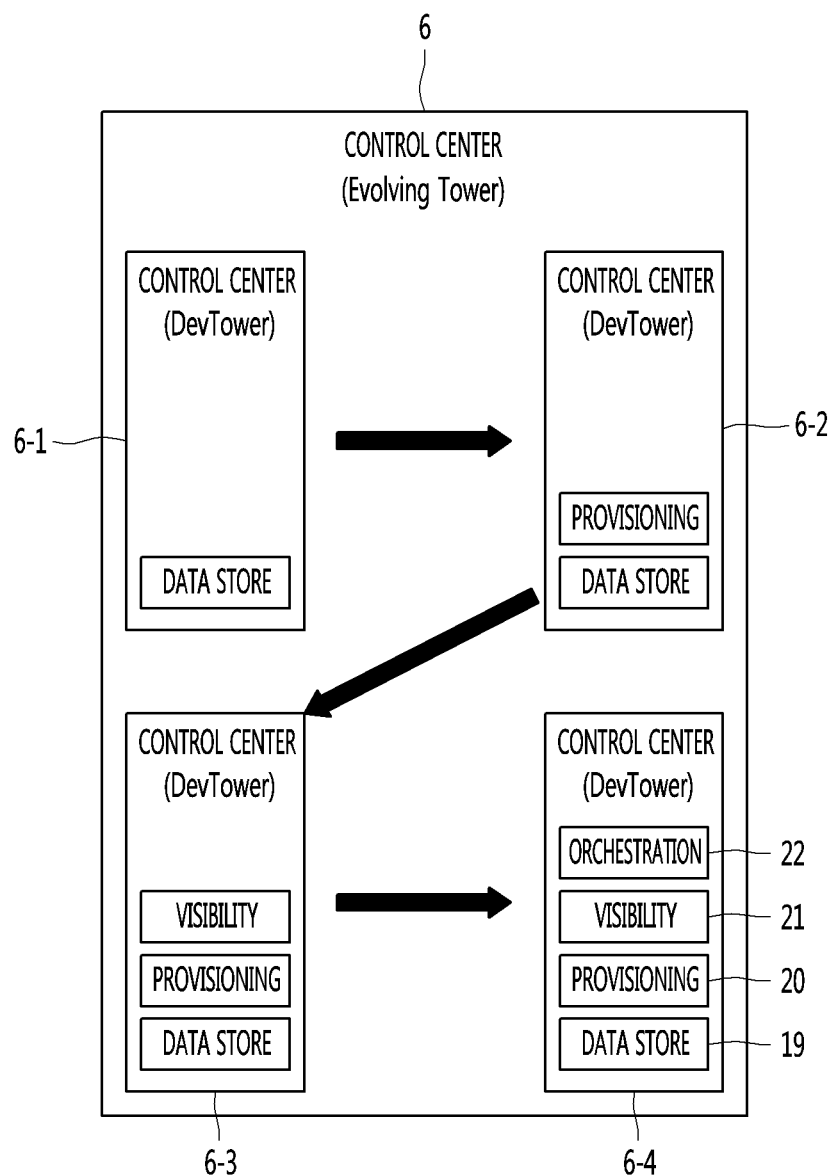
FIG. 5 is a block diagram illustrating the evolution of a control center according to an embodiment of the present invention.

FIG. 5 is a block diagram illustrating the evolution of a control center according to an embodiment of the present invention.

According to an embodiment of the present invention, a control center 6 may evolve step by step. In detail, the control center 6 may create internal functions in a container form and may move the internal functions. In addition, a task of transferring functions necessary for evolving the control center step by step and a task of provisioning components of the overlay cloud are performed in parallel in the pipeline form.

For example, regarding the evolution of the control center illustrated in FIG. 5, a control center 6-1 having only a data store function created therein evolves to include a provisioning function (a control center 602), evolves to ensure a visibility function (a control center 603), and then to ensure even an orchestration function (a control center 604).

Accordingly, the control center is configured as illustrated in FIG. 5, so that the overlay cloud is flexibly configured.

Figure 6:
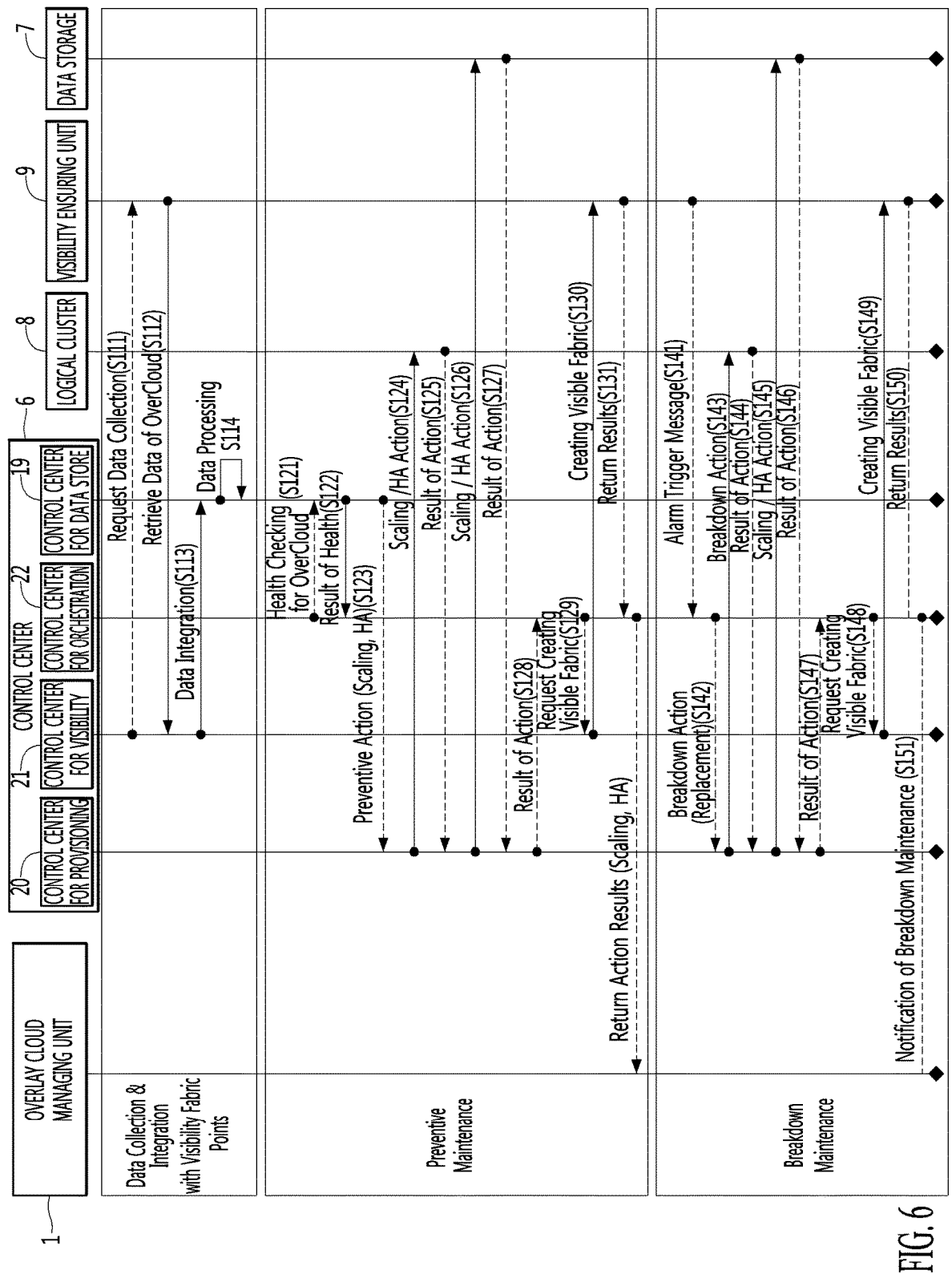
FIG. 6 is a flowchart illustrating overlay cloud maintenance.

FIG. 6 is a flowchart illustrating overlay cloud maintenance.

The overlay cloud maintenance refers to a scheme of maintaining the overlay cloud dynamically created. According to an embodiment of the present invention, the overlay cloud maintenance is performed by performing preventive maintenance and breakdown maintenance in parallel.

As illustrated in FIG. 6, the overlay cloud maintenance is performed through the interaction among the overlay cloud managing unit 1, the control center 6, the data storage 7, the logical cluster 8, and the visibility ensuring unit 9.

In addition, data is collected and detected by the visibility ensuring unit 9 of the created overlay cloud 10, and the physical breakdown or various problems are recognized based on information collected by the visibility ensuring unit 9. Alternatively, the abnormal phenomenon is detected based on the collected data. When it is determined that such a breakdown or the abnormal phenomenon occurs, the task of moving the overlay cloud is performed. In addition, an amount of data accessed by the data storage 7 is detected and the closeness relationship with the logical cluster 8 in which data is generated is determined, thereby determining the movement state of the data storage 7.

First, data collection and integration will be described below.

The control center 21 for the visibility requests for data collection from the visibility ensuring unit 9 (S111). The control center 21 for the visibility retrieves overlay cloud data from the visibility ensuring unit 9 (S112). The control center 21 for the visibility requests for data integration from the control center 19 for the data store (S113). The control center 19 for the data store processes data (S114).

Second, preventive maintenance will be described below.

The control center 22 for the orchestration requests for health checking for the overlay cloud from the control center 19 for the data store (S121). The control center 19 for the data store returns the result (S122). The control center 19 for the data store requests for a preventive action from the control center 20 for the provisioning (S123). The control center 20 for the provisioning requests for preventive actions for the logical cluster 8 and the data storage 7 and receives the results of the preventive actions (S124 to S127). The control center 20 for the provisioning transfers the received results to the control center 22 for the orchestration (S128). The control center 22 for the orchestration requests for the creation of the visibility ensuring unit to the control center 21 for the visibility (S129). The visibility ensuring unit 9 is created (S130) and the result is returned from the visibility ensuring unit 9 (S131). In addition, the result of the preventive action is returned to the overlay cloud meaning unit 1 (S132).

Third, the breakdown maintenance will be described below.

The visibility ensuring unit 9 detects the breakdown to transmit a trigger message for an alarm to the control center 22 for the orchestration (S141). The control center 22 for the orchestration requests for the breakdown action to the control center 20 for the provisioning (S142). The control center 20 for the provisioning performs breakdown actions for the logical cluster 8 and the data storage 7, and receives the returns of the result (S143 to S146). In addition, the control center 22 for the orchestration receives the action result from the control center for the provisioning. The control center 22 for the orchestration requests for the creation of the visibility ensuring unit from the control center 21 for the visibility (S148). The control center 21 for the visibility creates the visibility ensuring unit 9 (S149). The visibility ensuring unit 9 returns the result to the control center 22 for orchestration (S150). The returned result is notified to the overlay cloud managing unit 1 (S151).

Figure 7:
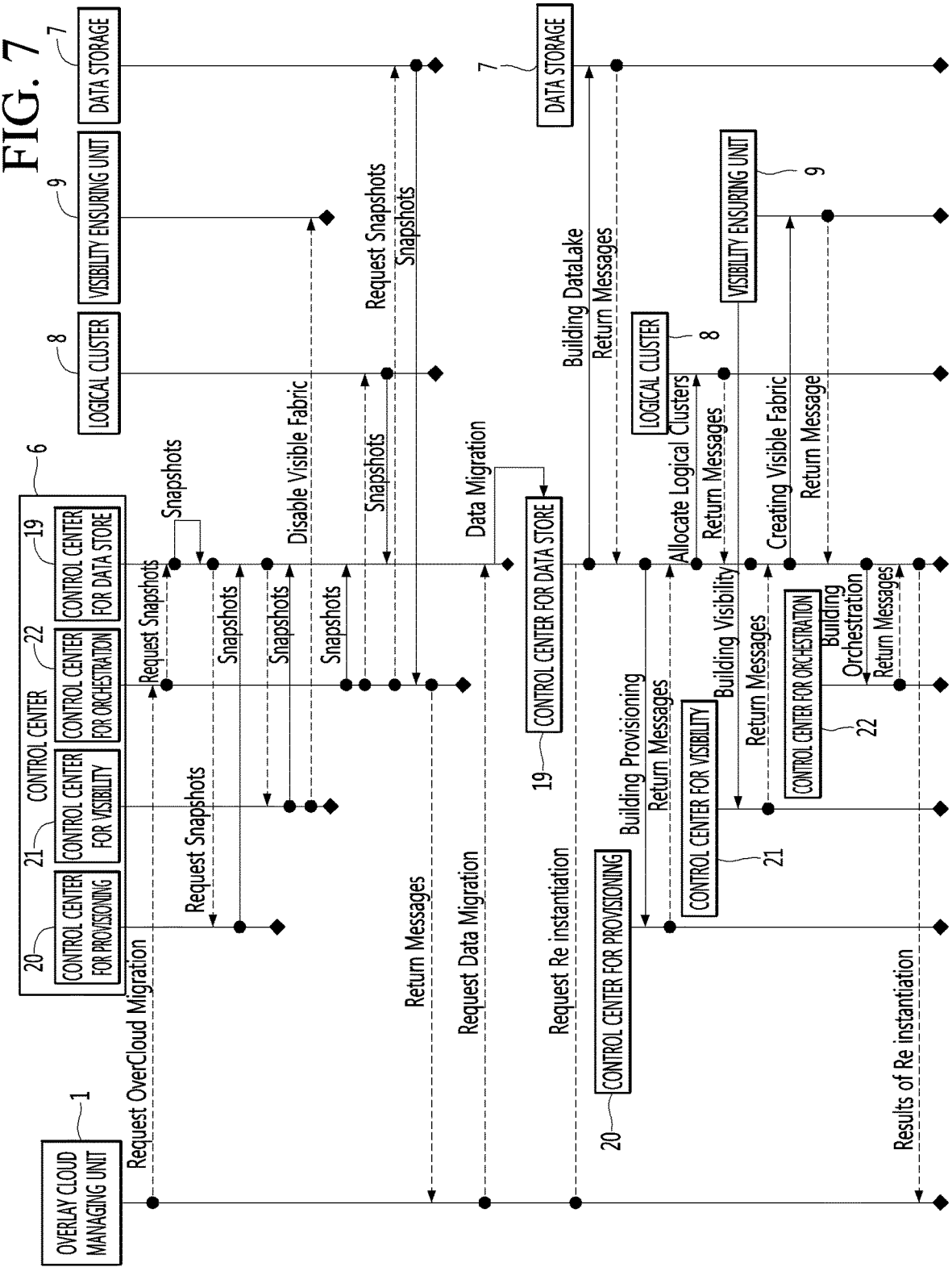
FIG. 7 is a flowchart illustrating overlay cloud migration.

FIG. 7 is a flowchart illustrating overlay cloud migration.

The migration relates to a scheme of moving the overlay cloud 10 dynamically created. According to an embodiment of the present invention, the overlay cloud migration is performed by performing overlay cloud migration based on the pipe line similarly to the creation of the overlay cloud 10.

According to an embodiment of the present invention, the overlay cloud migration is performed by progressing the snapshooting and the transferring of an image and the configuring the overlay cloud in parallel.

The overall migration is performed as follows. The command of the user or the abnormal phenomenon is detected, so the task of moving the overlay cloud 10 is performed. The overlay cloud is stored in the form of the image in parallel in the sequence of the control center 6 (the control center for the data store, the control center for the provisioning, the control center for the visibility, and the control center for the orchestration), the logical cluster 8, and the data storage 7 (in-parallel image storing and image processing in the pipe line form). In addition, the image is stored in the data store, and functions of the control center 6 are removed one by one in the sequence of provisioning→visibility→orchestration. The tower is rearranged in the sequence of the data store-→provisioning→visibility→orchestration based on the image in the data store. The data storage 7, the logical cluster 8, and the visibility ensuring unit 9 are rearranged in parallel in the pipeline form. In addition, the migration result is finally notified.

Figure 8:
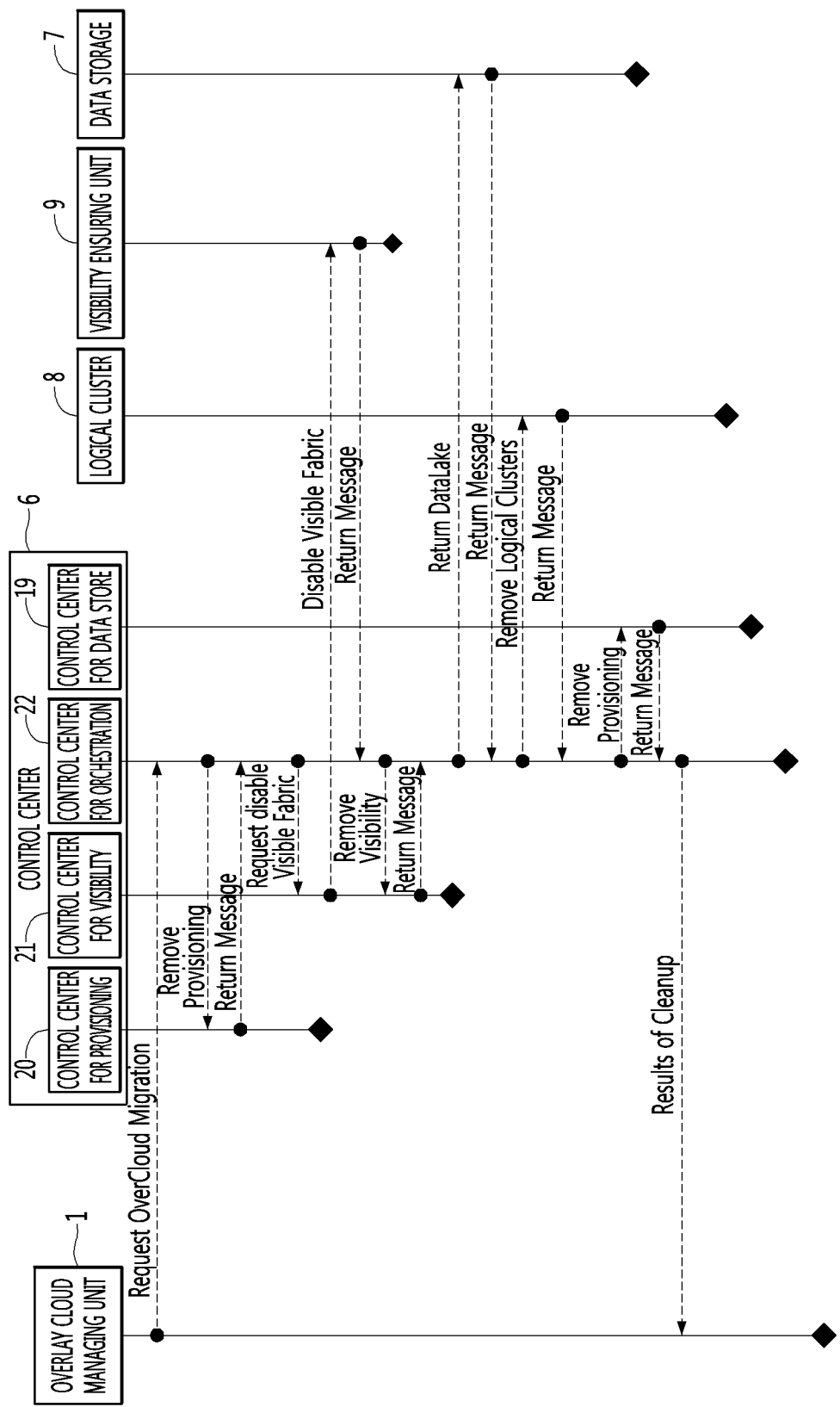
FIG. 8 is a flowchart illustrating overlay cloud clean-up.

FIG. 8 is a flowchart illustrating overlay cloud clean-up.

The overlay cloud clean-up relates to a scheme of cleaning up the overlay cloud dynamically created. According to an embodiment of the present invention, the clean-up of the overlay cloud is performed by deleting the control center 6, the data storage 7, the logical cluster 8, and the visibility ensuring unit 9.

The overall clean-up is performed through two steps of stopping data collection of the visibility ensuring unit 9, and retrieving resources of the data store 7, the logical cluster 8, the cloud, and the control center 6 (in detail, in the sequence of the control center 20 for the provisioning→the control center 21 for the visibility→the control center 19 for the data store→the control center 22 for the orchestration).

The above two steps are performed in parallel. When the clean-up has been finished, the cleaning-up of the overlay cloud 10 is notified to the overlay cloud managing unit 1. In addition, the infrastructure situation of the cloud provider 4 is updated by the overlay cloud managing unit 1.

The above-described invention is able to be implemented with computer-readable codes on a medium having a program. Computer-readable medium includes all types of recording devices having data which is readable by a computer system. For example, the computer-readable medium includes a hard disk drive (HDD), a solid state disk (SSD), a silicon disk drive (SDD), a ROM, a RAM, a CD-ROM, a magnetic tape, a floppy disk, or an optical data store device. In addition, the recording medium is implemented in the form of carrier waves (e.g., transmission over the Internet).

In addition, the computer may include the control unit of the terminal. Accordingly, the detailed description should be understood by way of example instead of being limitedly interpreted in terms of all aspects. The scope of the present invention should be determined by the reasonable interpretation of attached claims, and the equivalents of the present invention falls within the scope of the present invention.

What is claimed is:

1. A cloud service system implemented in a non-transitory computer-readable storage medium having stored computer-readable code, the cloud service system comprising:
    an under cloud including a public cloud and a private cloud;
    an overlay cloud including an environment for a developer and clustered in a logical cluster unit formed by partially selecting and binding resource fragments provided on the under cloud;
    an overlay cloud manager including:
    an overlay cloud control unit configured to dynamically configure and control the overlay cloud; and
    an under cloud resource managing unit configured to manage and distribute under cloud resources;
    a cloud provider communicating with the overlay cloud manager and configured to provide an infrastructure in which the overlay cloud is configured; and
    a direct connection point that physically connects the overlay cloud manager with the cloud provider, wherein the overlay cloud is dynamically configured and managed based on a workflow, wherein dynamically configuring and managing of the overlay cloud includes instantiation of the overlay cloud, wherein the overlay cloud includes a control center, and is generated as functions provided by the control center increase step by step.

2. The cloud service system of claim 1, wherein the overlay cloud is dynamically configured and managed through at least one of overlay cloud maintenance, overlay cloud migration, or overlay cloud clean-up.

3. The cloud service system of claim 1, wherein the overlay cloud includes:

at least one of a visibility ensuring unit, a logical cluster and a data store.

4. The cloud service system of claim 3, wherein the control center includes one of a first control center including only a data storing function, a second control center including a provisioning function in addition to the first control center, a third control center including a visibility function in addition to the second control center, or a fourth control center including an orchestration function in addition to the third control center.

5. The cloud service of claim 4, wherein the control center is able to evolve from the first control center to the second control center, from the second control center to the third control center, and from the third control center to the fourth control center.

6. The cloud service system of claim 4, wherein functions of the control center are present independently from each other.

7. The cloud service system of claim 6, wherein the functions of the control centers are sequentially transferred while tasks of forming the overlay cloud are performed in parallel in a form of a pipe line.

8. The cloud service system of claim 2, wherein maintenance of the overlay cloud is performed by performing preventive maintenance and breakdown maintenance in parallel.

9. The cloud service system of claim 2, wherein the overlay cloud migration is performed by progressing image processing and configuring the overlay cloud in parallel.

* * * * *